United States Patent [19]
Harp et al.

[11] Patent Number: 4,883,140
[45] Date of Patent: Nov. 28, 1989

[54] SHEET MATERIAL DISPENSING FOR AIR BEARING STRUCTURES

[75] Inventors: James J. Harp, Annandale, Va.; Robert Molten, Hagerstown, Md.

[73] Assignee: Admiralty Group Ltd., New London, Conn.

[21] Appl. No.: 168,407

[22] Filed: Mar. 15, 1988

Related U.S. Application Data

[63] Continuation-in-part of Ser. No. 42,815, Apr. 27, 1987.
[51] Int. Cl.$^4$ .......................... B60V 1/00; B65H 20/38
[52] U.S. Cl. ........................................ 180/116; 180/119; 180/125; 104/23.2; 242/67.1 R; 242/86.52
[58] Field of Search ................... 180/116, 119, 125, 9; 104/23.2; 242/55, 67.1 R, 86.5 R, 86.52, 75.4

[56] References Cited

U.S. PATENT DOCUMENTS

| | | | |
|---|---|---|---|
| 2,393,655 | 1/1946 | Robeck | 180/9 X |
| 3,108,804 | 10/1963 | Wagner | 242/86.52 X |
| 3,913,854 | 10/1975 | McClure | 242/86.52 X |
| 3,958,701 | 5/1976 | Yatagai et al. | 414/349 |
| 4,440,253 | 4/1984 | Pernum | 180/125 X |
| 4,705,229 | 11/1987 | Barazone | 242/86.52 |

FOREIGN PATENT DOCUMENTS

2840214 4/1979 Fed. Rep. of Germany .
371612 3/1939 Italy ........................................ 180/9

Primary Examiner—John A. Pekar
Attorney, Agent, or Firm—Nixon & Vanderhye

[57] ABSTRACT

Fingers having air bearings along the bottom thereof are used to quickly load and unload overseas transport containers. Sheet material, such as ribbed plastic (nylon) sheeting, is automatically dispensed between the fingers and loading deck so that it provides a smooth surface as the finger traverses the dock. A frame is mounted to the front of the finger, with a shaft on which the sheet material is coiled mounted to the frame, and an air motor for applying a generally constant tension (e.g. about 10 lbs. per square inch) to the plastic sheet. A hook or magnet is mounted in a recess in the deck and engages the free, leading end of the sheet material to hold it stationary on the deck as the finger traverses the deck, and thereby provide for automatic dispensing and take up of the sheet material.

20 Claims, 3 Drawing Sheets

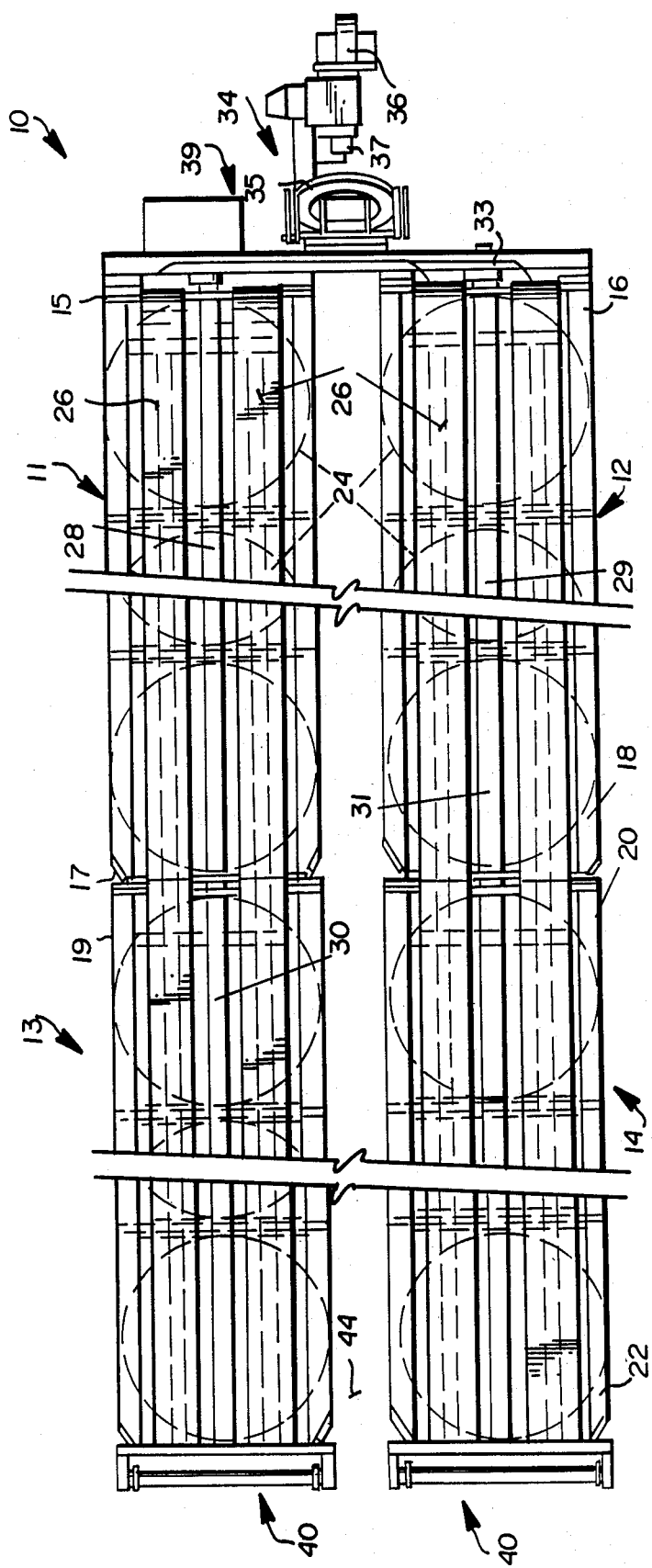
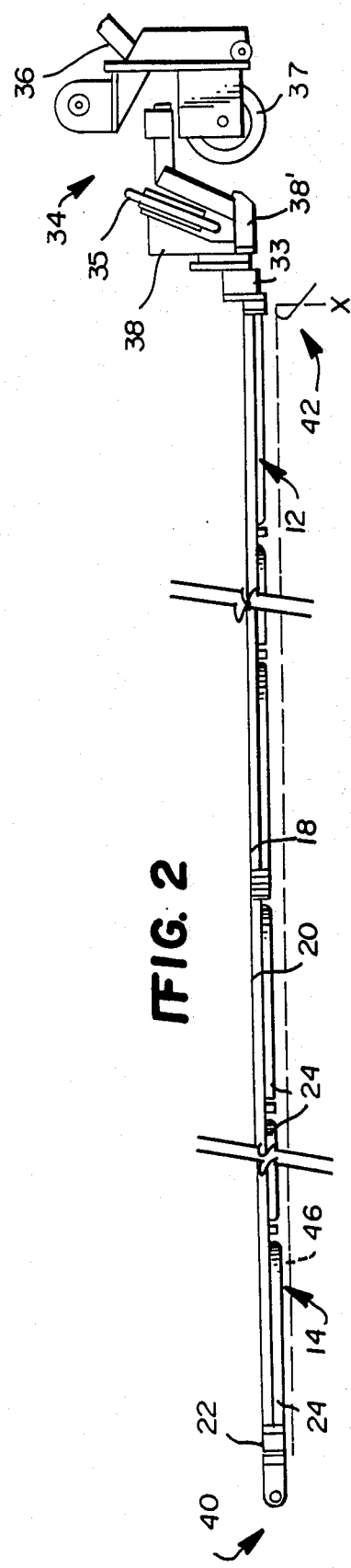
FIG. 1
FIG. 2

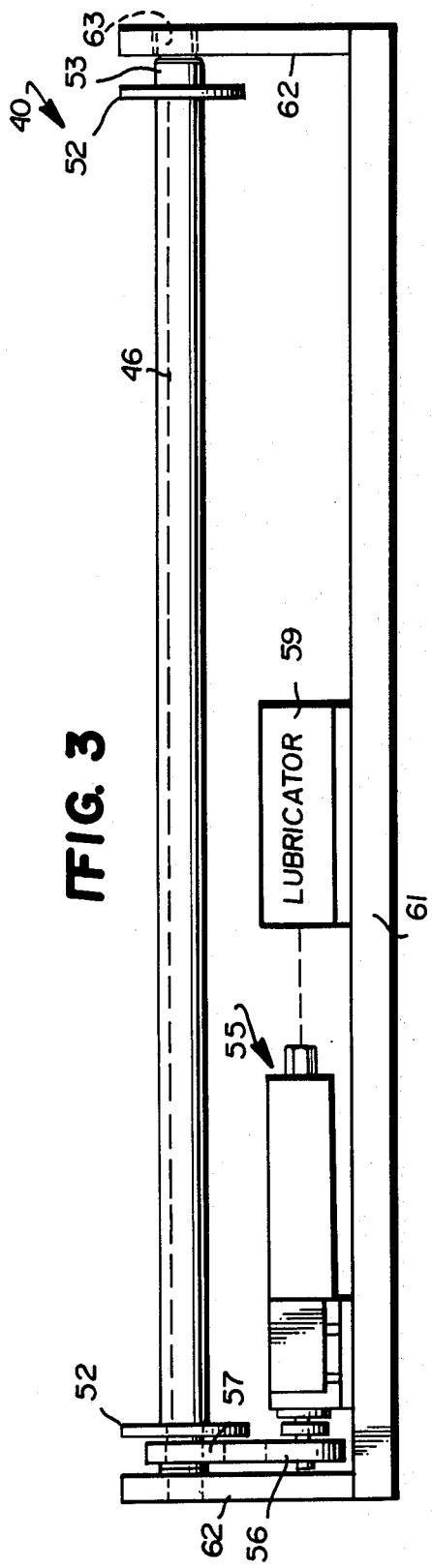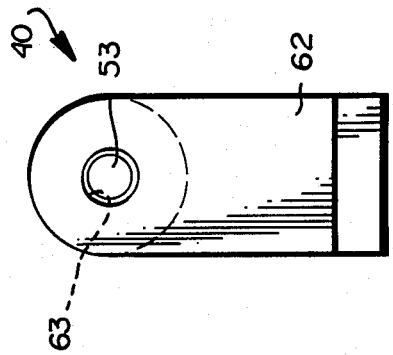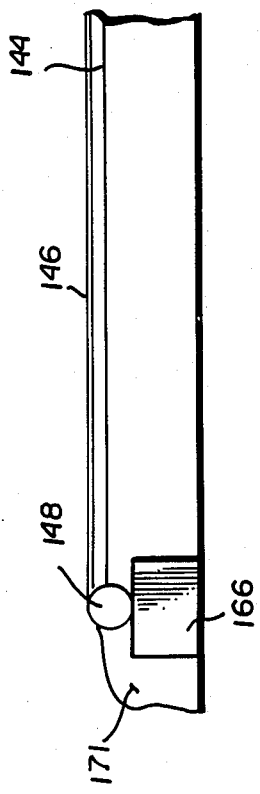

SHEET MATERIAL DISPENSING FOR AIR BEARING STRUCTURES

CROSS-REFERENCE TO RELATED APPLICATION

This application is a continuation-in-part of application Ser. No. 42,815 filed Apr. 27, 1987 pending the disclosure of which is incorporated by reference herein.

BACKGROUND AND SUMMARY OF THE INVENTION

In the parent application, an assembly and method are provided which facilitate the easy and inexpensive loading and unloading of overseas (long distance) transport containers. Utilizing fingers having air bearings disposed along the bottoms thereof, in a particular manner, it is possible to easily load and unload standard 20 and 40 foot containers, with virtually any goods that are mountable on pallets within the containers. Since sometimes the loading dock, or other deck surface which the fingers traverse during the loading and/or unloading operation, is rough and uneven, it is desirable to place sheet material, such as flexible plastic sheet material, over the deck surface in order to smooth out the unevenness and facilitate the movement of the air bearings thereover.

According to the present invention, an automated system and method are provided for disposing sheet material over the deck surface to be traversed during loading and unloading of containers, so as to make such loading and unloading as trouble free as possible. While the invention is particularly described with respect to assemblies and methods for loading and unloading transport containers, the invention also has applicability to other situations in which it is desirable to dispense, and then retract, flexible sheet material.

According to one aspect of the present invention, an assembly is provided for facilitating the movement of a heavy load into or out of an overseas transport container. The assembly includes at least one finger having a plurality of air bearings disposed along the bottom thereof, the air bearings connected to a source of air under pressure associated with the finger. The height of the finger is such that it may be inserted underneath a pallet to effect lifting of the pallet. A coiled supply of sheet material capable of providing a smooth surface for the air bearings is preferably mounted on a front end of the finger. Means are provided for supplying a constant tension to the supply of sheet material, preferably an air driven motor mounted to the front end of the finger and connected to it by gears or the like for applying a tension of about 10 lbs. per square inch to the sheet material. An engaging means for engaging a free end of the sheet material is preferably mounted at a predetermined point along the deck surface. In this way the supply of sheet material and sheet material engaging means are mounted so that as the finger moves over the deck surface the engaging means automatically engages the free end of the sheet material and holds it stationary with respect to the deck while the sheet is dispensed underneath the finger and provides a smooth surface over which the air bearings move. The sheet material engaging means may comprise a hook or a magnet mounted in a recess in the deck surface, and the free end of the sheet material may contain a metal bar around which the sheet material is wrapped.

According to another aspect of the present invention there is provided a method of facilitating movement of a load over a deck surface, utilizing at least one finger having air bearings disposed along the bottom thereof, and plastic sheet material adapted to be disposed on the deck surface below the air bearings so as to smooth the deck surface and facilitate movement of the air bearings, and load carried thereby, thereover, the method comprising the steps of: (a) Automatically dispensing the sheet material so that as the finger moves over the deck surface the sheet material will be provided between the air bearings and the deck surface over a significant portion of the length of travel thereof. And, (b) automatically taking up the sheet material as the finger moves in a reverse direction with respect to the deck. Preferably steps (a) and (b) are practiced by: mounting a coil of sheet material to a front end of the finger; applying a constant tension to the sheet material; and engaging a free end of the sheet material to hold it stationary with respect to the deck while the finger moves over the deck.

According to another aspect of the present invention there is provided, in general, apparatus for the automatic dispensing of sheet material comprising: A frame. A shaft mounted for rotation with respect to the frame, the shaft having sheet material coiled therearound, the sheet material including a free end having an engageable means associated therewith. Means mounted on the frame for supplying a force to the shaft so that constant tension is applied to the sheet material as it is dispensed from the shaft; and means for engaging the engageable means at the free end of the sheet material and to hold the free end stationary while the frame moves with respect to the engaging means, so that the sheet material is dispensed below the frame.

It is the primary object of the present invention to provide the automatic dispensing of sheet material, preferably to facilitate the movement of a finger with air bearings, supporting a load, over a surface on which the sheet material is dispensed. This and other objects of the present invention will become clear from an inspection of the detailed description of the invention, and from the appended claims.

BRIEF DESCRIPTION OF THE DRAWINGS

FIG. 1 is a top view, with portions cut away for clarity of illustration, of an exemplary assembly according to the invention;

FIG. 2 is a side view of the assembly of FIG. 1;

FIG. 3 is an end view of an exemplary sheet dispensing apparatus according to the invention;

FIG. 4 is a side view of the apparatus of FIG. 3;

FIG. 7 is a side schematic view of an alternative form of apparatus to that illustrated in FIG. 6.

DETAILED DESCRIPTION OF THE DRAWINGS

Figure 6:
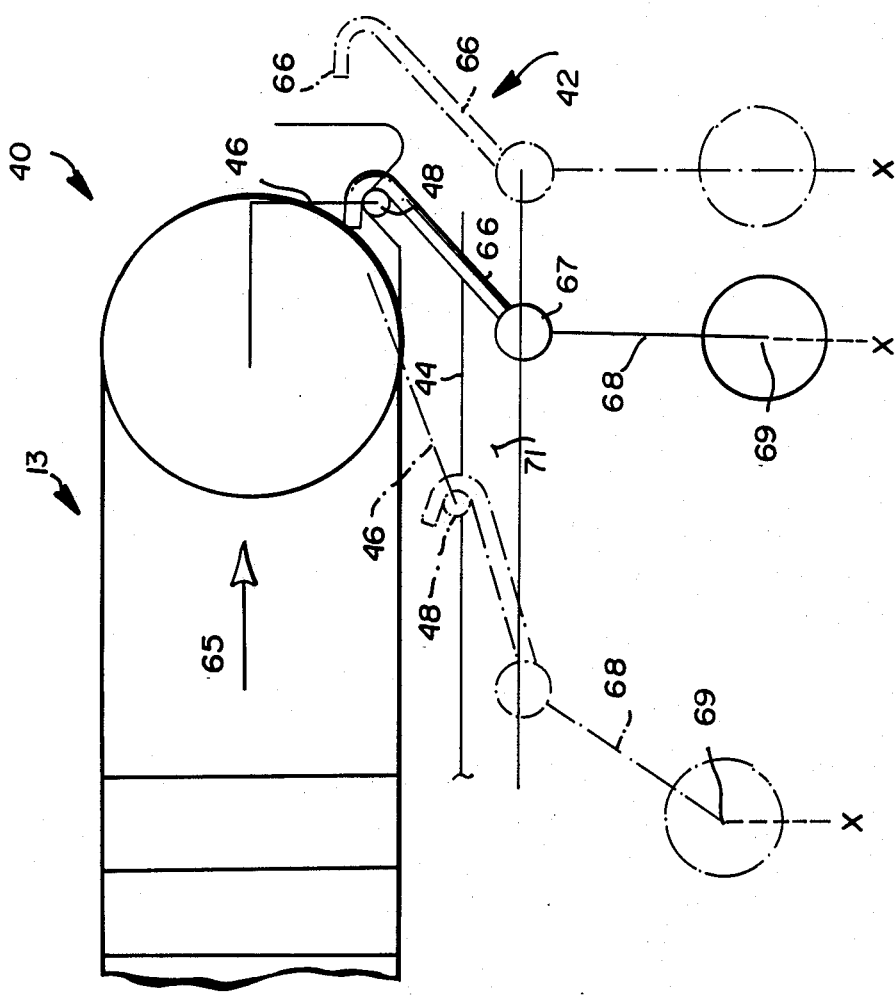
FIG. 6 is a side schematic view illustrating a manner of dispensing of sheet material according to the invention.

The basic assembly 10 illustrated in FIGS. 1 and 2 is that from the parent application. It includes at least one finger, and preferably first and second fingers 11, 12, which fit under a pallet. When unloading a 40 foot container, third and fourth fingers 13, 14 are provided.

The fingers are constructed of a relatively rigid material, such as steel. Each finger has first and second ends, the first and second fingers 11, 12 having first ends 15, 16 and second ends 17, 18, respectively, while the third and fourth fingers 13, 14 have first ends 19, 20 and second ends 21, 22, respectively. Each of the fingers 11 through 14 has a plurality of air bearings 24 on the bottom thereof.

Each finger 11 through 14 also has associated therewith, on the top surface thereof, at least one load bar, and preferably a pair of inflatable load bars 26. A central tubular portion is provided for each of the fingers 11 through 14 to supply air through the fingers to the air bearings 24. A combined metal structural cross-member and manifold 33 is connected to the first ends 15, 16 of the fingers 11, 12. It is desirable to operatively connect to the structural manifold element 33 a tractor 34, which includes an inflatable bladder 35 which is used to facilitate transfer of some of the load from the fingers 11 12 to the hand truck. A handle 36 includes controls for the hand truck, and a steerable wheel 37. A support 38 rigidly attached to the member 33 connects the element 33 to the hand truck 34, as does a link 38'.

According to the present invention, an apparatus is provided for automatically dispensing sheet material beneath the fingers 11 through 14 so that they traverse as smooth a surface as possible during movement of a load thereby. The basic components of the apparatus for automatically dispensing sheet material are illustrated generally by reference numerals 40 and 42.

With particular reference to FIG. 6, the apparatus 40 is desirably mounted on the end of one or more fingers (e.g. on fingers 13, 14 in FIGS. 1 and 2), for traversing a deck surface 44. Plastic sheet material 46 is coiled on the apparatus 40. One form that the free end of the plastic sheet material 46 may take is illustrated in FIG. 5, in which the sheet material 46 is wrapped around a bar 48 and means are provided defining an opening 50 for receipt of the structure 42.

The specific type of sheet material 46 is not particularly critical. Sheeting 46 may be any sheet material which is flexible and may be readily dispensed and taken up, yet can provide a smooth surface over which the air bearings can move, and does not tear easily. One suitable sheet material is plastic, but others include rubber and metal. Reinforced plastic sheet material, such as ribbed nylon, is especially desirable.

Figure 5:
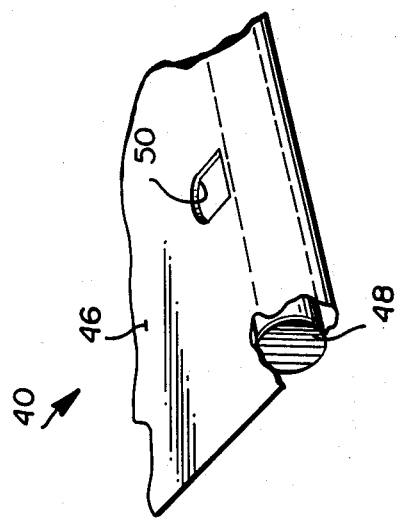
FIG. 5 is a top perspective schematic view illustrating a potential end configuration of the sheet material associated with the apparatus of FIGS. 3 and 4.

While a metal bar 48 and a semi-circular opening 50 are illustrated in FIG. 5, other structures can be provided for engaging the apparatus 42. For example a grommeted hole may be provided at the end of the sheet material 46.

As seen most clearly in FIG. 3, sheet material 46 preferably is disposed between flanges 52 on a shaft 53, being coiled around the shaft. A groove, such as a groove having a ⅛ inch width and ¼ inch depth, may extend along the length of the shaft 53 to receive the blind end of the sheet material 46 therein, thereby connecting it to the shaft 53. Alternate arrangements for connecting the material 46 to the shaft 53 also may be provided.

The apparatus 40 also comprises a means 55 for applying tension to the sheeting 46 as it is dispensed and taken up. As illustrated in the drawings the tension applying means 55 comprises an air driven motor which is connected by gears 56, 57 to the shaft 53. A lubricating assembly 59 may be mounted next to the motor 55. Motor 55 can be driven by the same air source as the bearings 24 or load bars 26. All of the components heretofore described preferably are mounted on a frame 61 having forward extending arm portions 62, with means defining an opening 63 in each arm 62 for receipt of the shaft 53, as seen most clearly in FIG. 4. The shaft 53 is thus rotatable with respect to the frame 61, with a constant force being applied to the shaft 53 by the motor 55, through gears 56, 57. Typically the motor 55 would apply force to the shaft 53 so that there was a substantially constant tension of about 10 lbs. per square inch on the sheeting 46.

FIG. 6 illustrates one particular structure 42 for engaging the free end of the sheeting 46. In this embodiment a hook 66, pivotally mounted at 67 within a recess 71 in the deck 44, is provided. As the finger 13 moves in the direction of arrow 65 in FIG. 6, the hook 66 will pass through the opening 50 and engage the bar 48. As movement of the finger 13 continues, the hook 66 will be pivoted downwardly (leftmost position in FIG. 6) until the bar 48 engages the deck 44, straddling the recess 71. If desired, the pivot point 67 may be mounted by a lever 68 to a shaft 69, to which spring tension or the like may be applied, to supply further tension to the sheeting 46.

An alternative configuration is illustrated in FIG. 7 where functionally comparable structures are illustrated by the same reference numeral as in FIG. 6 only preceded by a "1". In FIG. 7, a permanent magnet 166 is mounted within the recess 171 in deck 144, and is adapted to operatively engage the metal bar 148 (or other magnetizable, or magnetic, material at the free end of the sheeting 146), to hold the sheeting 146 as it is dispensed beneath the fingers 13, etc.

In either the FIGS. 6 or 7 situations, as the finger 13 ultimately moves back after loading, or unloading, a container (i.e. moves in a direction opposite to the direction 65 in FIG. 6), the sheeting 46 will automatically be taken up by the motor 55 on the shaft 53, and will automatically disengage from the hook 66 or magnet 166 once its end of travel is reached.

It will be seen that where a common loading dock area is provided for loading and unloading transport containers, it is a simple matter to provide a recess 71 in the deck 44 along the desired path of movement of the fingers 11 through 14, and thus easily automatically let out and take up the sheeting 46 to provide a smooth surface covering the deck 44, over which the air bearings 24 move.

While the invention has been herein shown and described in what is presently conceived to be a practical and preferred embodiment thereof, it will be apparent that many modifications may be made within the scope of the invention. For example, in some environments it may be possible to mount the sheeting so that it is on the deck and the engaging structure is mounted on the fingers. A wide variety of other modifications are also possible, thus the invention is to be accorded the broadest interpretation of the appended claims so as to encompass all equivalent structures and methods.

What is claimed is:

1. An assembly for moving a heavy load out of or into an overseas transport container over a deck, comprising:

(a) at least one finger having a plurality of air bearings disposed along the bottom of a length thereof and operatively connected to a source of air under pressure;

(b) a coiled supply of sheet material capable of providing a smooth surface for the air bearings of the finger to traverse;

(c) means for supplying substantially constant tension to said supply of sheet material to allow proper uncoiling and coiling thereof;

(d) means for engaging a free end of said sheet material to hold said free end relatively stationary with respect to said engaging means; and (e) means for mounting said structures (b), (c) and (d) to allow said sheet material to be uncoiled as said air bearings move with respect to the deck, to dispense sheet material over the deck and thereby facilitate movement of the air bearings over the deck.

2. An assembly as recited in claim 1 wherein said means (e) mounts said means (b) and (c) on an end of said finger, and said means (d) on the deck.

3. An assembly as recited in claim 2 wherein said means (e) further comprises means for mounting said means (d) within a recess in the deck, below the surface over which said sheet material is dispensed.

4. An assembly as recited in claim 3 wherein said sheet material free end includes means defining a hook-engaging opening therein, and wherein said means (d) comprises a hook mounted for pivotal movement with respect to said deck.

5. An assembly as recited in claim 3 wherein said means (d) comprises a magnet, and wherein said sheet material has a portion at the free end thereof adapted to be attracted by said magnet.

6. An assembly as recited in claim 2 wherein said means (c) comprises a shaft on which said sheet material is coiled, and a motor operatively connected to said shaft.

7. An assembly as recited in claim 6 wherein said motor comprises an air driven motor capable of applying about 10 lbs. per square inch of tension to the sheet material as it is uncoiled from said shaft, said motor connected by gears to said shaft.

8. An assembly as recited in claim 1 wherein said means (c) comprises a shaft on which said sheet material is coiled, and a motor operatively connected to said shaft.

9. An assembly as recited in claim 1 wherein said sheet material comprises a reinforced plastic sheet.

10. An assembly as recited in claim 9 wherein said plastic sheet material comprises nylon ribbed sheet material.

11. An assembly as recited in claim 1 wherein said sheet material free end comprises a bar, with an end section of the sheet material wrapped around said bar, said bar for operative engagement by said means (d).

12. A method of facilitating movement of a load over a deck surface, utilizing at least one finger having air bearings disposed along the bottom thereof, and flexible sheet material adapted to be disposed on the deck surface below the air bearings so as to smooth the deck surface and facilitate movement of the air bearings, and load carried thereby, thereover, said method comprising the steps of:

(a) automatically dispensing the sheet material so that as the finger moves in a first direction over the deck surface the sheet material will be provided between the air bearings and the deck surface over a significant portion of the length of travel thereof; and (b) automatically taking up the sheet material as the finger moves in a second direction, reverse to said first direction, with respect to the deck; and wherein steps (a) and (b) are practiced by mounting a coil of sheet material to a front end of the finger; applying a substantially constant tension to the sheet material; and engaging a free end of the sheet material to hold it stationary with respect to the deck while the finger moves over the deck.

13. A method as recited in claim 12 wherein steps (a) and (b) are further practiced by engaging the free end of the sheet material with a hook which is pivotally mounted in a recess in the deck surface, and wherein said tension applying step is practiced to apply a tension of approximately 10 lbs. per square inch to the sheet material.

14. A method as recited in claim 12 wherein steps (a) and (b) are practiced by wrapping the sheet free end around a bar of magnetic material, and holding the bar with a magnet.

15. Apparatus for the automatic dispensing of sheet material comprising:

a frame;

a shaft mounted for rotation with respect to said frame, said shaft having sheet material coiled therearound, said sheet material including a free end having an engageable means associated therewith, said sheet material free end comprising a bar with said sheet material wrapped around said bar; and means defining a hook engaging opening adjacent said bar;

means mounted on said frame for supplying a force to said shaft so that approximately constant tension is applied to the sheet material as it is dispensed from said shaft; and means for engaging said engageable means at the free end of said sheet material and to hold said free end stationary while said frame moves with respect to said engaging means, so that said sheet material is dispensed below said frame, comprising a hook which passes through said opening and engages said bar.

16. Apparatus as recited in claim 15 wherein said means for applying a force to shaft comprises an air driven motor operatively connected through gears to said shaft.

17. Apparatus as recited in claim 15 wherein said sheet material comprises a reinforced plastic sheet.

18. Apparatus for the automatic dispensing of sheet material comprising:

a frame;

a shaft mounted for rotation with respect to said frame, said shaft having sheet material coiled therearound, said sheet material including a free end having an engageable means associated therewith, said sheet material free end comprising a bar of magnetic material with said sheet material wrapped around said bar;

means mounted on said frame for supplying a force to said shaft so that approximately constant tension is applied to the sheet material as it is dispensed from said shaft; and means for engaging said engageable means at the free end of said sheet material and to hold said free end stationary while said frame moves with respect to said engaging means, so that said sheet material is dispensed below said frame, comprising a magnet.

19. Apparatus as recited in claim 18 wherein said means for applying a force to shaft comprises an air driven motor operatively connected through gears to said shaft.

20. Apparatus as recited in claim 18 wherein said sheet material comprises a reinforced plastic sheet.

* * * * *